Aug. 13, 1957 R. O. BIRCHLER 2,802,665
DEVICE FOR SELECTIVELY FEEDING TAPES
Filed April 26, 1956 2 Sheets-Sheet 1

INVENTOR
R. O. BIRCHLER
BY C. B. Hamilton
ATTORNEY

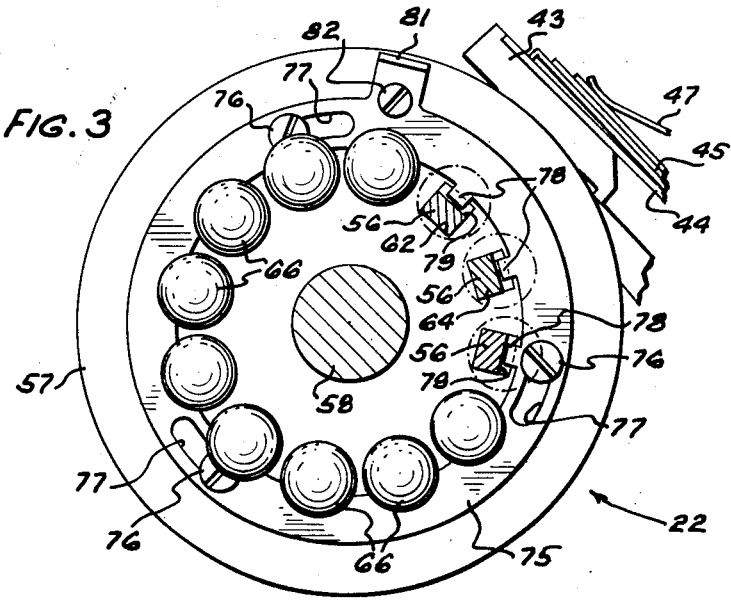
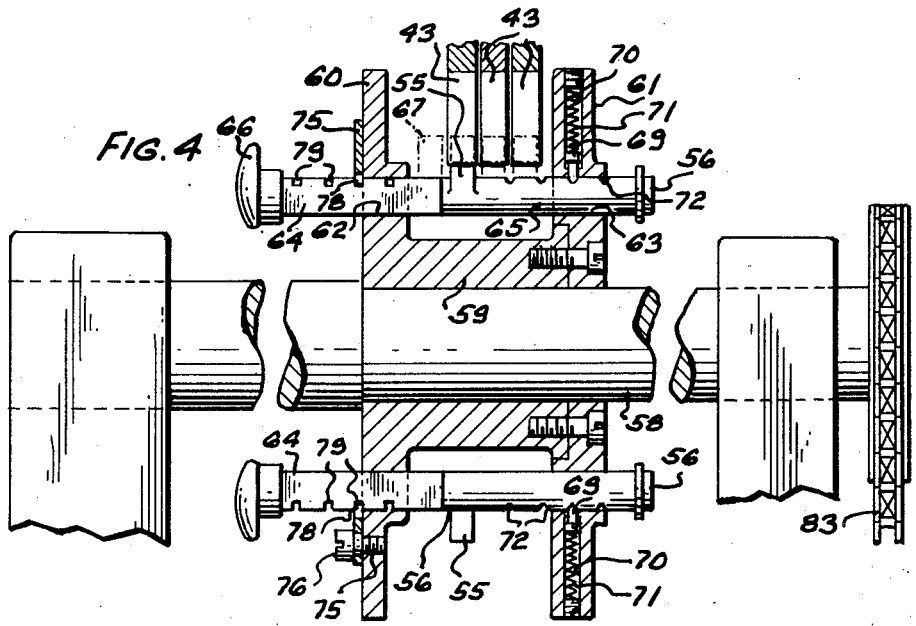

United States Patent Office 2,802,665
Patented Aug. 13, 1957

2,802,665
DEVICE FOR SELECTIVELY FEEDING TAPES

Robert O. Birchler, Cicero, Ill., assignor to Western Electric Company, Incorporated, New York, N. Y., a corporation of New York Application April 26, 1956, Serial No. 580,944

6 Claims. (Cl. 271—2.5)

This invention relates to a device for selectively feeding tapes and more particularly to a mechanism for selectively actuating a plurality of tape feeding devices to selectively feed different types of contact tapes in a predetermined sequence.

An object of the invention is to provide a device for selectively feeding a plurality of different types of tapes individually in a predetermined sequence.

Another object of the invention is to provide a mechanism for selectively actuating a plurality of feeding devices individually to feed different types of tapes in a predetermined sequence.

A device illustrating certain features of the invention for selectively actuating a plurality of tape feeding devices individually to feed different kinds of contact tapes through a predetermined distance in a predetermined sequence may include a rotatable carrier for supporting and successively moving a plurality of rods past the feeding devices. The rods have individual cams thereon and are manually movable into different predetermined positions on the carrier with the cams in alignment with none or selected ones of the tape feeding devices for selectively actuating the tape feeding devices to feed the different kinds of tape through a predetermined distance in a predetermined sequence in response to rotation of the carrier.

Other objects and advantages of the invention will become apparent by reference to the following detailed description and the accompanying drawings illustrating a preferred embodiment thereof, in which—

Fig. 3 is an elevational sectional view of a portion of the tape feeding device showing the carrier for supporting the actuating rods thereon; and Fig. 4 is a fragmentary cross-sectional view through the device taken on line 4—4 of Fig. 2.

Figure 1:
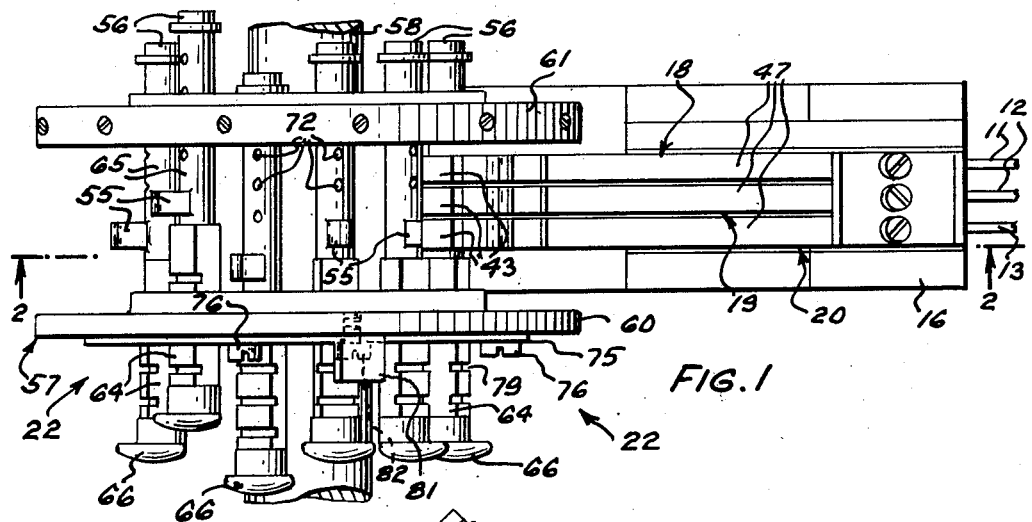
Fig. 1 is a fragmentary plan view of the device for selectively feeding different kinds of contact tapes.

The present device is designed to feed a plurality of tapes 11, 12, and 13 into an apparatus (not shown) which shears contacts from the tapes and welds them onto wire spring relays as disclosed in co-pending application, Serial No. 347,335, filed April 7, 1953, now issued as Patent No. 2,749,419 on a machine for welding contacts onto switch parts. The contact tapes are guided for horizontal parallel movement in guideways 14 in a supporting plate 15 mounted in a frame 16 and the tapes are individually advanced by a plurality of tape feeding devices 18, 19, and 20 in the form of hitch feeds which are selectively actuated by an actuating mechanism 22.

Figure 2:
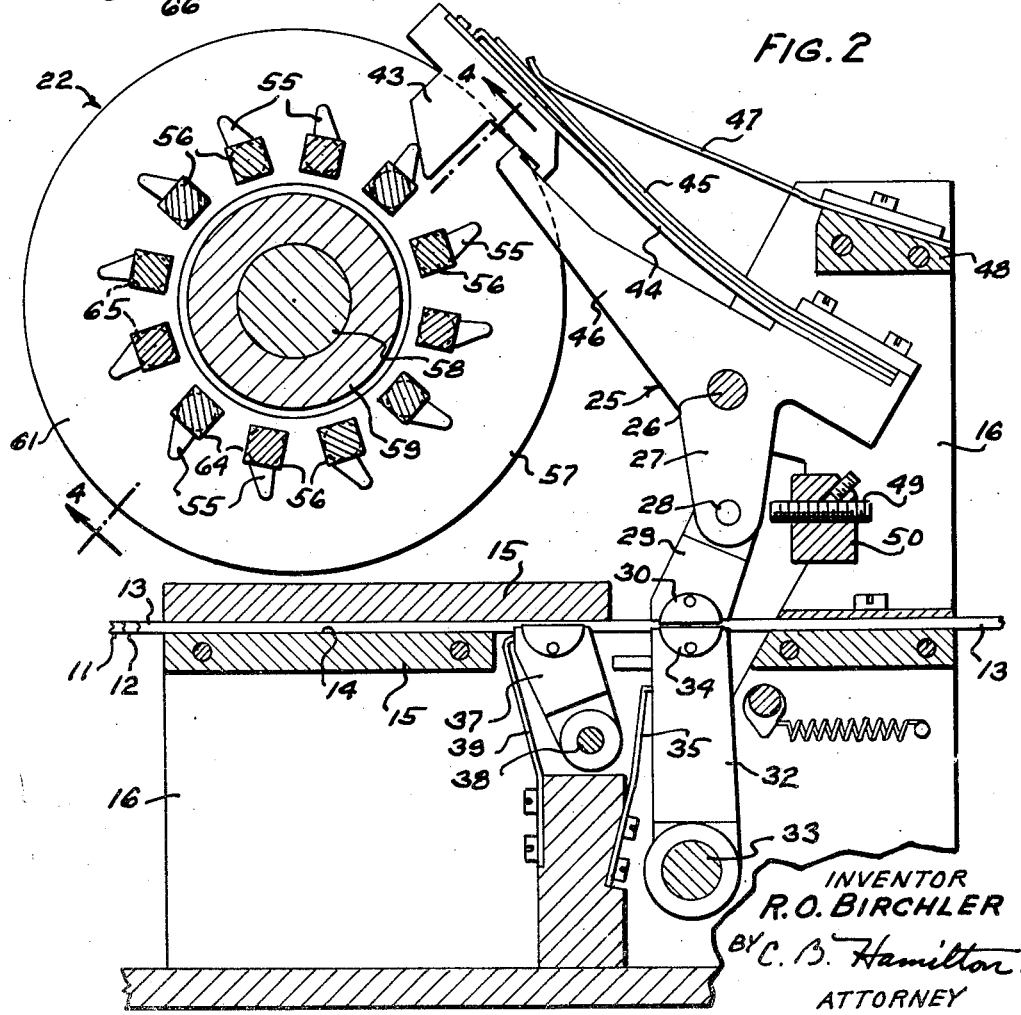
Fig. 2 is a vertical cross-sectional view of the device shown in Fig. 1 taken on line 2—2 of Fig. 1.

The hitch feeds 18, 19, and 20 each comprises a bell crank lever 25 supported for oscillatable movement on a pivot rod 26 which is supported in the frame 16. The downwardly extending arm 27 of the bell crank has a pivot pin 28 to which an arm 29 is pivotally connected and the lower end of the arm 29 has a substantially semi-circular recess for receiving a substantially semi-cylindrical block 30 with a flat gripping surface engageable with one of the contact tapes. An arm 32 positioned beneath the arm 29 of each of the hitch feeds, is oscillatably mounted on a supporting rod 33 and has a cylindrical recess in its upper end for receiving a semi-cylindrical block 34 therein which has a shallow groove for receiving the contact tape and is positioned below the block 30 of the arm 29 for cooperation therewith to grip the tape and advance it a predetermined distance in response to oscillation of the bell crank 25. Springs 35 stress the levers 32 for returning movement in a clockwise direction as viewed in Fig. 2. A holding pawl 37 pivotally mounted on a supporting pin 38 and stressed for oscillating movement in a clockwise direction is provided for each of the tapes and cooperates with the plate 15 for holding the tapes against retractive movement.

The bell crank 25 has a cam element 43 which is made as a separate piece and is connected to the upper arm 46 of the bell crank by a flat flexible spring 44 which cooperates with supplemental leaf springs 45 to yieldably maintain the cam element 43 in engagement with the arm 46. Leaf springs 47 mounted on a cross member 48 of the frame 16 stress the bell crank levers 25 for movement in a counterclockwise direction as viewed in Fig. 2, and threaded stops 49 adjustably mounted in a cross member 50 of the frame limit the movement of the bell cranks in this direction.

The mechanism 22 for selectively actuating the tape feeding devices 18, 19, and 20 comprises a plurality of cams 55 formed individually on rods 56 which are arranged in a circle and mounted on a rotary carrier 57 on a drive shaft 58. This carrier has a hub 59 and a pair of spaced circular flanges or heads 60 and 61 thereon in which are formed rectangular and cylindrical apertures 62 and 63, respectively, for slidably receiving rectangular portions 64 and cylindrical portions of the rods 56 for supporting the rods for axial movement into predetermined positions and for preventing rotation of the rods relative to the carrier. The cams 55 on the rods 56 are relatively narrow and are adapted to engage the sloping surfaces of the cam elements 43 of the bell cranks 25 for individually actuating the feeding devices 18, 19, and 20 in response to rotation of the carrier 57. The rods 56 may be moved to a fourth predetermined position with the actuating cams 55 located in a position indicated in dotted lines at 67 in Fig. 4 in laterally spaced relation to the cam elements 43 in which position the cams 55 do not engage the cam elements 43 and do not actuate any of the feeding devices 18, 19, and 20. Detents 69 mounted in radially disposed apertures 70 in the flange 61 of the carrier are urged by springs 71 into engagement with spaced recesses 72 in the rods 56 for aligning and yieldably retaining the rods in the various selected positions on the carrier.

To prevent displacement of the rods 56 during the operation of the device, locking means are provided for positively locking them in their selected positions which comprises a locking ring 75 (Fig. 3) mounted on the face of the flange 60 by a plurality of shouldered screws 76 on the carrier which pass through arcuate slots 77 in the locking ring. The ring 75 has a plurality of tongues 78 projecting radially inwardly therefrom engageable in transverse slots 79 in the rods 56 for locking the rods against axial displacement. When it is desired to reset the rods 56 to other predetermined positions a handle 81 on the locking ring is engaged by the operator and the ring is rotated in a counterclockwise direction as viewed in Fig. 3 to move the tongues 78 thereof from the slots 79 in the rods 56 after which the rods are moved axially to the desired predetermined positions. The locking ring is then turned clockwise to the position shown in Fig. 3 to cause the tongues 78 to enter the slots 79 and lock the rods in position, after which a screw 82 is inserted in an aperture in the ring 75 and screwed into a tapped hole in the flange 60 to prevent movement of the ring 75 on the carrier 57. The shaft 58 on which the carrier 57 is mounted, is journalled in suitable bearings and is driven by suitable drive means including a chain and sprocket connection 83 for rotating the carrier 57 and causing the cams 55 thereon to selectively actuate the tape feeding devices 18, 19, and 20 in a predetermined sequence to effect the selective feeding of the tapes 11, 12, and 13 in timed relation to the other components of the machine (not shown) hereinbefore referred to.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a selective tape feeding mechanism, a plurality of feeding devices for individually feeding tapes, a plurality of actuating members each having a cam for individually actuating the tape feeding devices, a carrier for supporting the actuating members for movement with the carrier along a predetermined path successively past the tape feeding devices and for movement thereon transversely of said path into predetermined positions to locate the cams thereon in alignment with none or selected ones of the tape feeding devices, means for moving the actuating members into selected predetermined positions on the carrier, means for retaining the actuating members in said predetermined positions on the carrier, and means for actuating the carrier.

2. In a selective tape feeding mechanism, a plurality of feeding devices for feeding tapes individually, a plurality of actuating rods each having a cam for individually actuating the tape feeding devices, a rotatable carrier for supporting the rods in spaced relation to each other and moving them through a predetermined path past the feeding devices and for axial movement on the carrier into predetermined positions to locate the cams thereon in alignment with none or selected ones of the tape feeding devices, means for moving the actuating members into selected ones of said predetermined positions on the carrier, means for simultaneously locking the rods in said predetermined positions on the carrier, and means for rotating the carrier to move the rods successively past the tape feeding devices to cause the cams thereon to actuate the tape feeding devices in a selected sequence.

3. In a selective tape feeding mechanism, a plurality of feeding devices arranged in lateral relation to each other for individually feeding tapes in parallel relation to each other, a plurality of actuating rods each having a cam for individually actuating the tape feeding devices, a carrier mounted for rotation about an axis transversely of the direction of movement of the tapes for supporting the actuating rods in spaced and parallel relation to each other and to said axis for axial movement on the carrier and against rotary movement relative thereto, means for moving the rods into predetermined positions on the carrier to locate the cams thereon in alignment with selected ones of the tape feeding devices, a plurality of spring pressed detents on the carrier engaging the rods, said rods having a pluarity of axially spaced recesses cooperable with the detents for locating and yieldably retaining the rods in the predetermined positions, and means for rotating the carrier to move the actuating rods successively past the tape feeding devices to cause the cams thereon to selectively actuate the tape feeding devices in a predetermined sequence.

4. In a selective tape feeding mechanism, a plurality of feeding devices arranged in lateral relation to each other for individually feeding tapes in parallel relation to each other, a plurality of actuating rods each having a cam for individually actuating the tape feeding devices, a carrier mounted for rotation about an axis transversely of the direction of movement of the tapes for supporting the actuating rods in spaced and parallel relation to each other and to said axis for axial movement on the carrier and against rotary movement relative thereto, means for moving the rods into predetermined positions on the carrier to locate the cams thereon in alignment with none or selected ones of the tape feeding devices, a plurality of spring pressed detents on the carrier engaging the rods, said rods having a plurality of axially spaced recesses cooperable with the detents for locating and yieldably retaining the rods in the predetermined positions, means for simultaneously locking the rods in their selected predetermined positions against axial movement for unlocking them, and means for rotating the carrier to move the actuating rods successively past the feeding devices to cause the cams thereon to selectively actuate the tape feeding devices in a predetermined sequence.

5. In a selective tape feeding mechanism, a plurality of feeding devices arranged side by side for individually feeding the tapes through a predetermined distance in spaced and parallel relation to each other, a plurality of actuating rods each having a cam for individually actuating the tape feeding devices, a rotatable carrier mounted for rotation about an axis transversely of the direction of movement of the tapes for supporting the actuating rods in spaced and parallel relation to each other and said axis for axial movement on the carrier and against rotary movement relative thereto, means for moving the rods into predetermined positions on the carrier to locate the cams thereon in alignment with none or selected ones of the tape feeding devices, said rods having a plurality of axially spaced recesses, a locking ring mounted on the carrier for oscillatable movement to and from first and second positions and having portions thereof movable into and out of the transverse slots in response to movement of the locking ring to and from said first and second positions, means for moving the locking ring from a first position to a second position to move the said portions thereon into the slots in the actuating rods for locking the rods in their selected predetermined positions against axial movement, and means for rotating the carrier to move the actuating rods successively past the feeding devices to cause the cams thereon to selectively actuate the tape feeding devices in a predetermined sequence.

6. In a selective tape feeding mechanism, a plurality of feeding devices arranged side by side for individually feeding the tapes through a predetermined distance in parallel relation to each other, a plurality of actuating rods each having a cam for individually actuating the tape feeding devices, a rotatable carrier mounted for rotation about an axis transversely of the direction of movement of the tapes for supporting the rods in spaced and parallel relation to each other and said axis for axial movement on the carrier and against rotary movement relative thereto, means for moving the rods axially into predetermined positions on the carrier to locate the cams thereon in alignment with none or selected ones of the tape feeding devices, said rods having a plurality of axially spaced recesses and transverse slots, a plurality of spring pressed detents on said carrier engageable in the recesses in the rods for aligning and yieldably retaining the rods in selected predetermined positions, a locking ring mounted on one end of the carrier for oscillatable movement to and from first and second positions and having portions thereof movable into and out of the transverse slots in response to movement of the locking ring to and from said first and second positions, means for moving the locking ring from a first position to a second position to move the said portions thereon into the slots in the actuating rods for locking the rods in their selected positions against axial movement, and means for rotating the carrier to move the actuating rods successively across the feeding means to cause the cams thereon to selectively actuate the tape feeding devices in a predetermined sequence.

No references cited.